US006589739B2

(12) United States Patent
Fisher

(10) Patent No.: US 6,589,739 B2
(45) Date of Patent: *Jul. 8, 2003

(54) BIOPOLYMER ARRAY INSPECTION

(75) Inventor: William D. Fisher, San Jose, CA (US)

(73) Assignee: Agilent Technologies Inc., Palo Alto, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 09/772,842

(22) Filed: Jan. 29, 2001

(65) Prior Publication Data

US 2003/0104370 A1 Jun. 5, 2003

Related U.S. Application Data

(63) Continuation of application No. 09/419,447, filed on Oct. 15, 1999, now Pat. No. 6,232,072.

(51) Int. Cl.[7] .............................. C12Q 1/68; C07K 5/00; C07H 21/04
(52) U.S. Cl. .............................. 435/6; 530/300; 536/23.1
(58) Field of Search .............................. 435/6; 530/300; 536/23.1

(56) References Cited

U.S. PATENT DOCUMENTS

| | | |
|---|---|---|
| 5,508,200 A | 4/1996 | Tiffany et al. |
| 5,631,734 A | 5/1997 | Stern et al. |
| 5,721,435 A | 2/1998 | Troll |
| 5,982,534 A | 11/1999 | Pinkel et al. |
| 6,232,072 B1 * | 5/2001 | Fisher .............................. 435/6 |

OTHER PUBLICATIONS

Website http://www.packardinst.com/pr/pr899–2.htm, Press Release: "New Options Optimize Arraying Technology", Aug. 1, 1999, Packard Instrument Company, date downloaded—Oct. 13, 1999.
Website http://www.packardinst.com/prod_serv/biochiparrayer.htm, "BioChip Arrayer: Automated DNA Microarray Fabrication", Packard Instrument Company, date downloaded—Oct. 13, 1999.
U.S. patent application titled, "Polynucleotide Array Fabrication," U.S. Ser. No. 09/302,898, filed Apr. 30, 1999 by Michael P. Caren et al.
U.S. patent application titled, "Biopolymer Arrays and Their Fabrication," U.S. Ser. No. 09/359,527, filed Jul. 22, 1999 by Peter G. Webb et al.

* cited by examiner

Primary Examiner—Kenneth R. Horlick
Assistant Examiner—Young Kim
(74) Attorney, Agent, or Firm—Gordon M. Stewart

(57) ABSTRACT

A method of fabricating a biopolymer array, and an apparatus which can execute the method, droplets of fluid carrying the biopolymer or a biomonomer are deposited onto a front side of a transparent substrate. Light is directed through the substrate from the front side, back through a substrate back side and a first set of deposited droplets on the first side to an image sensor. The substrate may be mounted by means of a chuck with parallel channels, and a scanning operation of a droplet dispensing head, light source, and sensor conducted in unison in the direction of the channels.

36 Claims, 4 Drawing Sheets

BIOPOLYMER ARRAY INSPECTION

This application is a continuation of application Ser. No. 09/419,447 filed Oct. 15, 1999, now a U.S. Pat. No. 6,232,072. Priority is claimed from the foregoing application under 35 U.S.C. 120.

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include features (sometimes referenced as spots or regions) of usually different sequence polynucleotides arranged in a predetermined configuration on a substrate. The arrays, when exposed to a sample, will exhibit a binding pattern. The array can be interrogated by observing this binding pattern by, for example, by labeling all polynucleotide targets (for example, DNA) in the sample with a suitable label (such as a fluorescent compound), and accurately observing the fluorescent signal on the array. Assuming that the different sequence polynucleotides were correctly deposited in accordance with the predetermined configuration, then the observed binding pattern will be indicative of the presence and/or concentration of one or more polynucleotide components of the sample. Peptide arrays can be used in a similar manner.

Biopolymer arrays can be fabricated using either in situ synthesis methods or deposition of the previously obtained biopolymers. The in situ synthesis methods include those described in U.S. Pat. No. 5,449,754 for synthesizing peptide arrays, as well as WO 98/41531 and the references cited therein for synthesizing polynucleotides (specifically, DNA). Such in situ synthesis methods can be basically regarded as iterating the sequence of depositing droplets of: (a) a protected monomer onto predetermined locations on a substrate to link with either a suitably activated substrate surface (or with a previously deposited deprotected monomer); (b) deprotecting the deposited monomer so that it can now react with a subsequently deposited protected monomer; and (c) depositing another protected monomer for linking. Different monomers may be deposited at different regions on the substrate during any one iteration so that the different regions of the completed array will have different desired biopolymer sequences. One or more intermediate further steps may be required in each iteration, such as oxidation and washing steps.

The deposition methods basically involve depositing biopolymers at predetermined locations on a substrate which are suitably activated such that the biopolymers can link thereto. Biopolymers of different sequence may be deposited at different regions of the substrate to yield the completed array. Washing or other additional steps may also be used. Typical procedures known in the art for deposition of polynucleotides, particularly DNA such as whole oligomers or cDNA, are to load a small volume of DNA in solution in one or more drop dispensers such as the tip of a pin or in an open capillary and, touch the pin or capillary to the surface of the substrate. Such a procedure is described in U.S. Pat. No. 5,807,522. When the fluid touches the surface, some of the fluid is transferred. The pin or capillary must be washed prior to picking up the next type of DNA for spotting onto the array. This process is repeated for many different sequences and, eventually, the desired array is formed. Alternatively, the DNA can be loaded into a drop dispenser in the form of an inkjet head and fired onto the substrate. Such a technique has been described, for example, in PCT publications WO 95/25116 and WO 98/41531, and elsewhere. This method has the advantage of non-contact deposition.

In either method of fabrication, glass or other transparent material, is often used for the substrate. Such materials particularly lend themselves to linking of a nucleotide of a monomer or polymer. Further, in array fabrication, the quantities of DNA available for the array are usually very small and expensive. Sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down accurately in the desired pattern, are of the correct size, and that the DNA is uniformly coated within the feature. Normally, in an automated apparatus the features are deposited according to a target array pattern.

However, every component in an array deposition apparatus are subject to errors such as component failure or variances in its operating parameters within, or sometimes even outside of, normal tolerances for such component. For example, a dispensing head used to dispense fluid droplets to form the array, may have one or more jets which fail or which vary slightly in the size of the droplets dispensed, the orientation of the jets with respect to one another, or the orientation of the head itself in the apparatus may be slightly off from a nominal position. Whatever the error source, the result is that a target array pattern is not produced. That is, there is a discrepancy between the target array pattern and the actual array pattern deposited. These discrepancies can occur in each cycle of the in situ process, or during deposition of presynthesized polynucleotides.

The validity of the results of any test using an array, is dependant on knowing where the features are on the carrier substrate and if they were actually there on the substrate to begin with. A line scan camera can be used to observe droplets after their deposition during fabrication to reduce the possibility that during array use in a test, a reaction did not occur because a feature was missing or subject to some other error, thereby resulting in a false test result. However, observing the droplets during array fabrication can, as a practical matter, be difficult. For example, it is difficult to obtain sufficient reflected light from either the droplets or substrate surface to the camera sensor as the droplets move past the line scan camera. The amount of light the camera sensor is exposed to is inversely proportional to the speed of the objects being viewed. The faster the objects move, the less light reaches the camera, which can result in poor image contrast for reliable feature imaging. While the fabrication speed could be slowed to capture more light, this is undesirable from a manufacturing perspective and so the line scan camera should capture images at the running speed of the system. An additional issue with obtaining sufficient light to the camera is that when the substrate is glass or is otherwise transparent, and given that the droplets themselves may be transparent and colorless, most of the light will pass through the substrate and not make it back to the camera.

It would be useful then, to provide a means by which arrays can be fabricated by depositing droplets of monomer, polymer, or any other material used during array formation, and in which the deposition of the droplets can be accurately and rapidly observed even against a transparent substrate. It would also be useful if any such means is relatively simple to construct and offers little interference with other components of a deposition apparatus.

SUMMARY OF THE INVENTION

The present invention realizes that relatively good images can be obtained of deposited droplets of monomer, polymer (such as DNA, RNA, or peptides), or other fluids deposited on one side of a transparent substrate during array fabrication, by back lighting those droplets (that is, by providing illumination from the back side of the substrate). However, the present invention further realizes that back lighting during array fabrication is not particularly practical. For example, the substrate should preferably be firmly and precisely held in a known position at all times so that droplets will be deposited at least close to the expected locations, while still being supported on a back side. This implies some type of clamping and support structure across a back side of the substrate thereby making the to provision of any lighting system across the back side during array manufacture, difficult. Further, illuminating an entire back side of a substrate could lead to undue heating which could adversely affect sensitive biopolymers, given the intensity of illumination required. The present invention realizes that back lighting a transparent substrate during array fabrication can be accomplished by providing a mirror on the back side and illuminating and imaging from the front side on which droplets are deposited. The present invention further realizes that scanning illumination on the front side can avoid undue heating.

The present invention then, provides a method of fabricating a biopolymer array (for example, a polynucleotide or, more specifically, a DNA or RNA array). The method includes depositing droplets of fluid carrying the biopolymer or a biomonomer onto a front side of a transparent substrate. Light is directed through the substrate from the front side, back through a substrate back side and a first set of deposited droplets on the first side to an image sensor. In this manner, the first set is "imaged". The light may optionally pass through the substrate from the front side at a position other than the first droplet set before being reflected to pass back through the back side of the substrate and first droplet set. Particularly, the light may pass through the substrate from the first side at an angle to a normal of the first side, and pass back through the back side and first droplet set at a complementary angle to the normal. Alternatively, the light may pass through the first droplet set when passing through the substrate from the first side, before being reflected to again pass through the first droplet set. In either event, the light is optionally reflected at a position spaced from the back side.

The directing of light in the foregoing manner may be repeated for additional sets of the deposited droplets by scanning the directed and reflected light across the first side. This can, for example, be accomplished by scanning both a light source of the directed light and the image sensor in unison across the first surface. Furthermore, the droplets may be deposited as droplet sets by a head, and multiple droplet sets may be deposited by scanning the head across the first side. Any deposited set may or may not be the same set that is later imaged by the sensor as a set. Further, the light source, image sensor and head are preferably physically interconnected and are scanned in unison across the first surface. The mirror preferably faces at least that area on the second side corresponding to that area on the first side across which droplet sets are deposited.

The substrate may, in one arrangement, be held in a chuck having multiple upstanding ribs to support the second side of the substrate. In this case, the mirror from which light is reflected may include multiple mirror segments extending along channels defined between the ribs. The head may be scanned across the first side of the substrate by scanning along the channels in turn. The direction of light from the source to the sensor may be on a plane oriented along (and preferably parallel to) the direction of the channels, and the source and sensor also scanned in a direction along (and preferably parallel to) the channels. This is particularly useful in the case where the light source and camera are positioned at so as to direct and receive the reflected light at complementary angles in the manner as described above. The head may be adjusted toward or away from the first side of the substrate independently of the sensor.

An apparatus which can execute a method of the present invention, is also provided. Such an apparatus includes a mount on which a transparent substrate can be mounted. A head is provided to deposit the fluid droplets onto the front side of the mounted substrate. A light source, reflector, and image sensor are also provided to execute the steps required by them, as described above. The apparatus may include other features as already described in connection with the method. For example, the apparatus may further include a transport system for the head, light source and image sensor, so as to move them in a manner as described, preferably including scanning in unison (with the head, light source, and image sensor being preferably physically interconnected as described above). A processor may also be provided to control the transport system as required and cause the head to dispense multiple droplet sets in co-ordination with relative movement of the head and substrate. Other elements may include the substrate mount in the form of a chuck, as described above.

Apparatus and methods of the present invention, can be also be used to deposit droplets of any other fluid moiety or moieties, and embodiments of the apparatus can be described by replacing "biopolymer", or similar terms with "moiety". Also, methods of the present invention can be executed without the deposition step in the event that the droplets were previously provided on the substrate.

The present invention can provide any one or more of a number of advantages. For example, the deposition of the droplets can be accurately observed against a transparent substrate. The imaging arrangement is relatively simple to construct and offers little interference with other components of a deposition apparatus, such a chuck of the type described. The light source and camera scanning arrangement can offer rapid scanning with little interference from chuck components, such as the described ribs.

BRIEF DESCRIPTION OF THE DRAWINGS

To facilitate understanding, identical reference numerals have been used, where practical, to designate identical elements that are common to the figures.

DETAILED DESCRIPTION OF EMBODIMENTS OF THE INVENTION

Figure 1:
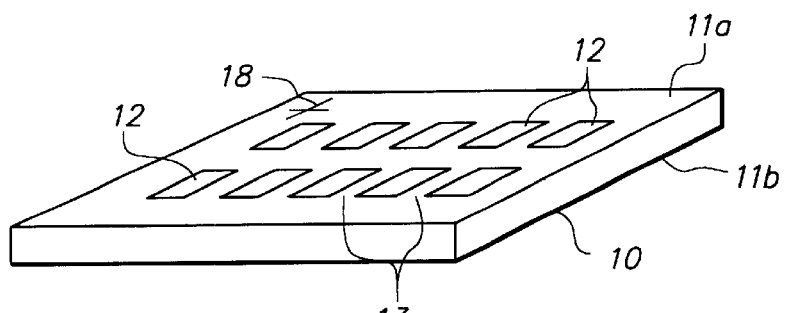
FIG. 1 is a perspective view of a substrate bearing multiple arrays, as may be produced by a method and apparatus of the present invention.

In the present application, unless a contrary intention appears, the following terms refer to the indicated characteristics. A "biopolymer" is a polymer of one or more types of repeating units. Biopolymers are typically found in biological systems and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution). An "addressable array" includes, for example, any one or two dimensional arrangement of discrete regions (or "features") bearing particular biopolymer moieties (for example, different polynucleotide sequences) associated with that feature and positioned at a particular location on the substrate (an "address"). These features may or may not be separated by intervening spaces. By "viewing" or "imaging" a set of droplets and "sensors" for accomplishing such imaging, references using any optical device to provide data on the whether the droplets are present, and/or the location and/or size of the droplets. "Light" includes visible or non-visible light (including infra-red or ultraviolet). It will also be appreciated that throughout the present application, words such as "upper", "front", "back", and the like are used with reference to a particular orientation of the apparatus with respect to gravity, but it will be understood that other operating orientations of the apparatus or any of its components, with respect to gravity, are possible. To "position" one item with respect to another, includes moving either one or both of them to obtain the desired relative positioning. "Fluid" is used herein to reference a liquid. Reference to a "droplet" being dispensed herein (whether from a pulse jet or otherwise), merely refers to a discrete small quantity of fluid (usually less than about 1000 pL) being dispensed at a given time (for example, upon a single pulse of the pulse jet corresponding to a single activation of an ejector) and does not require any particular shape of this discrete quantity. Droplets may be dry, but more typically will still be wet at the time they are inspected. However, it will be understood that a given feature may be formed from one or multiple pulses from one or multiple nozzles. A "set" may contain one or multiple members. The head or substrate moving as droplets are dispensed, includes actual movement during and/or between the dispensing of multiple droplets. By one item being "remote" from another is referenced that they are at least in different buildings, and may be at least one, at least ten, or at least one hundred miles apart.

Figure 2:
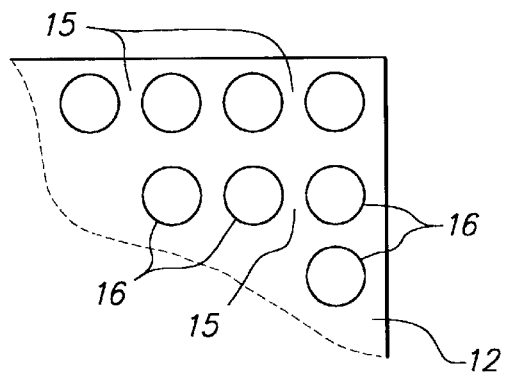
FIG. 2 is an enlarged view of a portion of FIG. 1 showing some of the identifiable individual regions (or "features") of a single array of FIG. 1.
Figure 3:
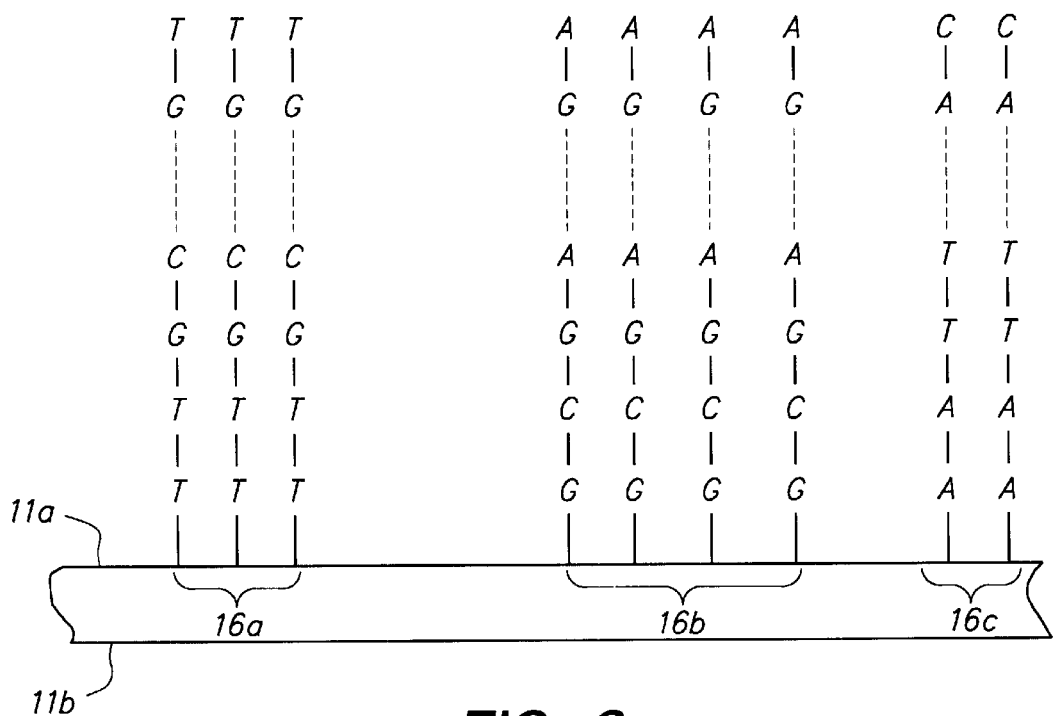
FIG. 3 is an enlarged cross-section of a portion of FIG. 2.

Referring first to FIGS. 1–3, typically the present invention will produce multiple identical arrays 12 (only some of which are shown in FIG. 1), separated by inter-array regions 13, across the complete front surface 11a of a single transparent substrate 10. However, the arrays 12 produced on a given substrate need not be identical and some or all could be different. Each array 12 will contain multiple spots or features 16 separated by inter-feature regions 15. A typical array 12 may contain from 100 to 100,000 features. All of the features 16 may be different, or some or all could be the same. Each feature carries a predetermined moiety (such as a particular polynucleotide sequence), or a predetermined mixture of moieties (such as a mixture of particular polynucleotides). This is illustrated schematically in FIG. 3 where different regions 16 are shown as carrying different polynucleotide sequences. Arrays of FIGS. 1–3 can be manufactured by in situ or deposition methods as discussed above.

Figure 4:
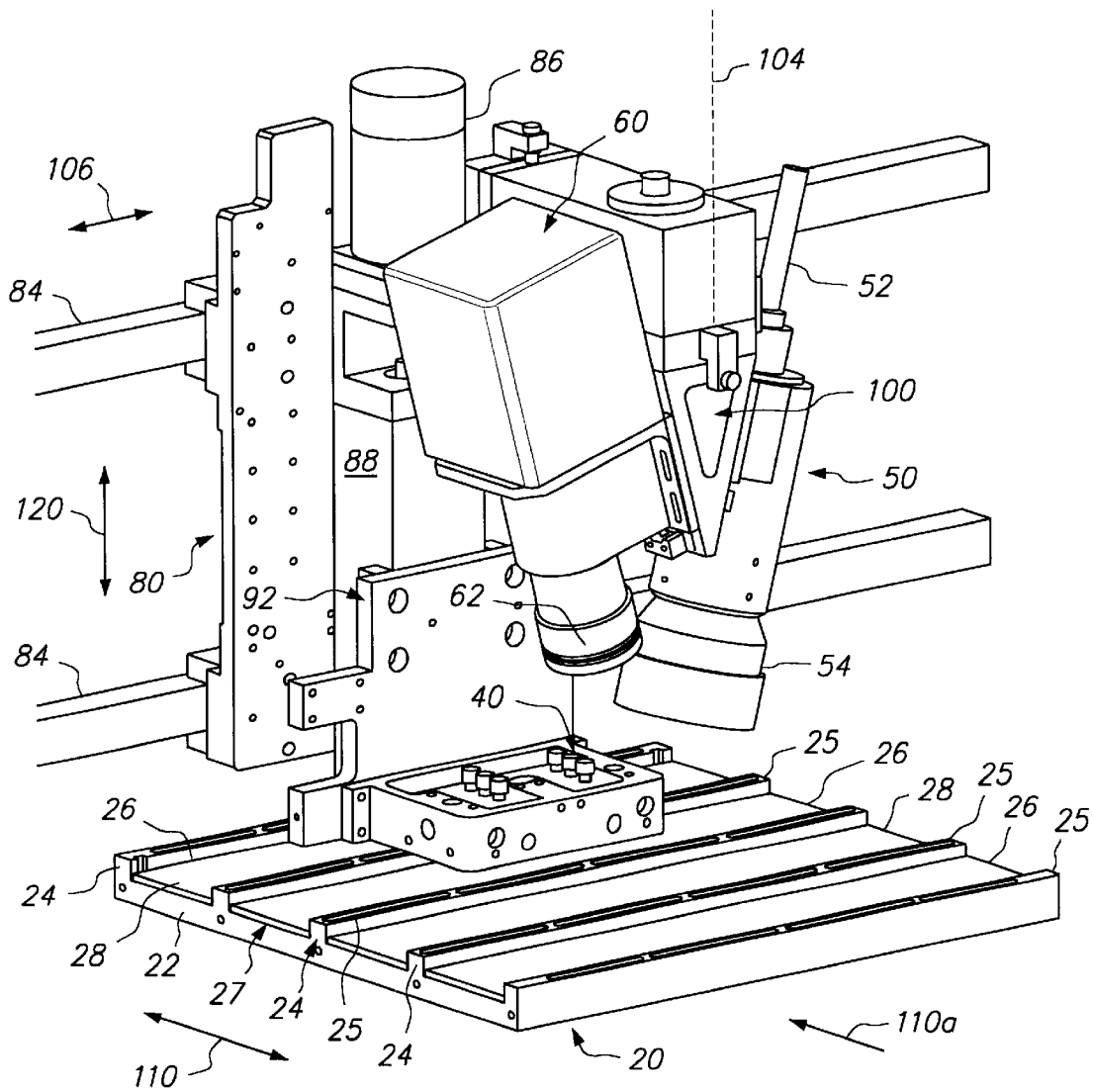
FIG. 4 is perspective view of an apparatus of the present invention without a mounted substrate.

Referring to FIG. 4 the apparatus shown includes a mount for substrate 10 in the form of chuck 20. Chuck 20 is a vacuum chuck of generally rectangular configuration, and includes a bottom plate 22, and a plurality of upstanding parallel linear ribs 24 which define a series of parallel rectangular channels 26 between them. Ribs 24 have upper surfaces with openings which communicate with a suitable vacuum source (not shown), such that ribs 24 can hold against, and support, a second side 11b of a mounted substrate 10. A mirror 27 is provided, in the form of multiple mirror segments 28 extending along the bottom of respective channels 26 between ribs 24, so as to be spaced from a back side 11b of a mounted substrate 10. Mirror segments may be defined by a metallized reflecting layer on the back surface of a glass or other transparent substrate. (although front surfaced mirrors could be used if desired). In this situation it will be understood that reference to a "mirror" refers to the actual reflecting layer.

The apparatus further includes two tracks 84 along which a first frame member 80 can be precisely moved by means of a motor 86 (also mounted on frame member 80) working against tracks 84 through a track drive. Tracks 84, frame member 80, motor 86 and track drive, act as components of a first transporter. Heads 40 are provided to deposit droplets of biopolymer or biomonomer solution onto the front side 11a of a mounted substrate 10. Heads 40 are mounted to a third frame member 92 by a head retainer 44, third frame member 92 being slidable toward and away from chuck 20 on a second frame member 88 fixedly mounted to first frame member 80. A suitable motor and drive mechanism, which act as components of a second transporter, are provided inside second frame member 88 to cause such movement. Chuck 20 is also provided with a suitable motor and drive mechanism (not shown), which act as components of a third transporter, which can move chuck 20 in a direction 110. Thus, the first and second transporters act as a transport system which can scan heads 40 across front surface 11*a* of a mounted substrate 10 to deposit multiple droplets of biopolymer of biomonomer solution. Such scanning would normally be done in a row by row format. In the row by row format heads 40 are first moved by the transport system in the direction of axis 106, which movement is co-ordinated by a suitably programmed processor (not shown) with firing of the pulse jets of heads 40 to deposit a row of droplets in accordance with a target array pattern. Note that by virtue of head 40 construction as described below, a "row" will typically include multiple lines of droplets. Substrate 40 is then moved by the transport system parallel to axis 110, specifically in the direction of arrow 110*a* at least the width of one row, and the process repeated. Of course, other deposition formats could be used.

A light source 50 is mounted to first frame member 80 through block 100 to direct light through substrate 10 front the front side 11*a*. Light source 50 includes a lens 54 and an optical fiber bundle 52 which communicates light in the visible region (substantially 400 nm to 700 nm) from a suitable source (not shown). A linescan camera 60 includes an adjustable focus lens 62 and a linear CCD or other linear sensor 64 (see FIG. 5) oriented parallel to axis 110. Camera 60 (and hence sensor 64) are mounted to first frame member 80 by being mounted on a side of block 100 opposite that of light source 50. Note that the block 100 is so constructed such that the angle α between the light directed by light source 50 through mounted substrate 10 (shown by axis 130 in FIG. 5) and a normal 104 to first side 11*a* of mounted substrate 10, and the angle β between the light which is reflected light back through the back side 11*b* (shown by axis 140 in FIG. 5) and normal 104, are complementary angles (that is, of the same magnitude but in opposite directions about normal 104). The total angle (α+β) should be kept as small as possible (such as less than 50° or even less than 40°), limited only by the physical size of the components, to provide a compact arrangement. Furthermore, keeping the angle small limits the distance at which mirror 27 needs to extend beyond the array being formed. Note also that the direction of the light from light source 50 (as illustrated by axis 130) and to sensor 64, lie on a common plane which is oriented in the direction of channels 26 (specifically, by being parallel to those channels 26).

The above apparatus is used to fabricate an array in the following manner. It will be understood that all of the operations particularly following mounting of the substrate 10, can be controlled by a suitably programmed processor, such as a programmed general purpose processor or any hardware/software equivalent. It will be assumed that the heads have already been loaded with one or more biopolymer or biomonomer solutions, that lens 62 is already adjusted so as to be focussed on the front surface 11*a* of a mounted substrate, and that the light source 50 and camera 60 are ON. First, heads 40 are moved away from chuck 24 by the second transporter causing third member 92 to slide upward (as viewed in FIG. 4) on second member 88. Note that the above described construction allows heads 40 to be adjusted toward or away from chuck 20 (and hence first side 11*a* of substrate 10) independently of movement of sensor 64. That is, camera 60 will not move during such height adjustment of heads 40, and thus the focus of camera 60 is not affected by such height adjustment. Substrate 10 may then be mounted on chuck 20 by placing it with its back side 11 in contact with upper surfaces 25 of ribs 24. A vacuum is applied through ribs 24 to the openings so as to firmly retain second side 11*b* in position supported against ribs 24. The substrate mounting operation is then complete. Heads 40 may then have their height readjusted to a suitable distance from first side 11*a* for dispensing fluid droplets, by again using the second transporter.

The processor then causes transport system to scan heads 40 across the front side 11*a* of substrate 40 in unison with light source 50 and camera 60, in a row by row format as described above. Simultaneously, the processor activates the pulse jets in heads 40 in a sequence to dispense multiple droplets in co-ordination with relative movement of the head and substrate, in accordance with the target array pattern. Light source 50 and sensor 64 are positioned such that sensor 64 images a set of droplets (referenced as a "first set"), specifically a line of droplets, forming part of at least one row deposited as part or all of one or more previously deposited rows. Thus, the mounted substrate 10 has been repositioned with respect to light source 50 and sensor 64 in order to image the first droplet set. As the scan continues along a row, sensor 64 images droplets and provides data to the processor for analysis as to droplet characteristics (for example, any one or more of whether a droplet is present, its location, or its size). The results of the analysis may be compared with the expected characteristic based on the target array pattern, and used to identify array errors, stop and/or correct the fabrication process for subsequent arrays or substrates, or be communicated to a remote or local user of an array (either as hardcopy printed instruction, or electronically). Alternatively, the droplets observed can be part of a test print, and the results used to more carefully set up the apparatus for depositing actual biopolymer arrays.

Figure 5:
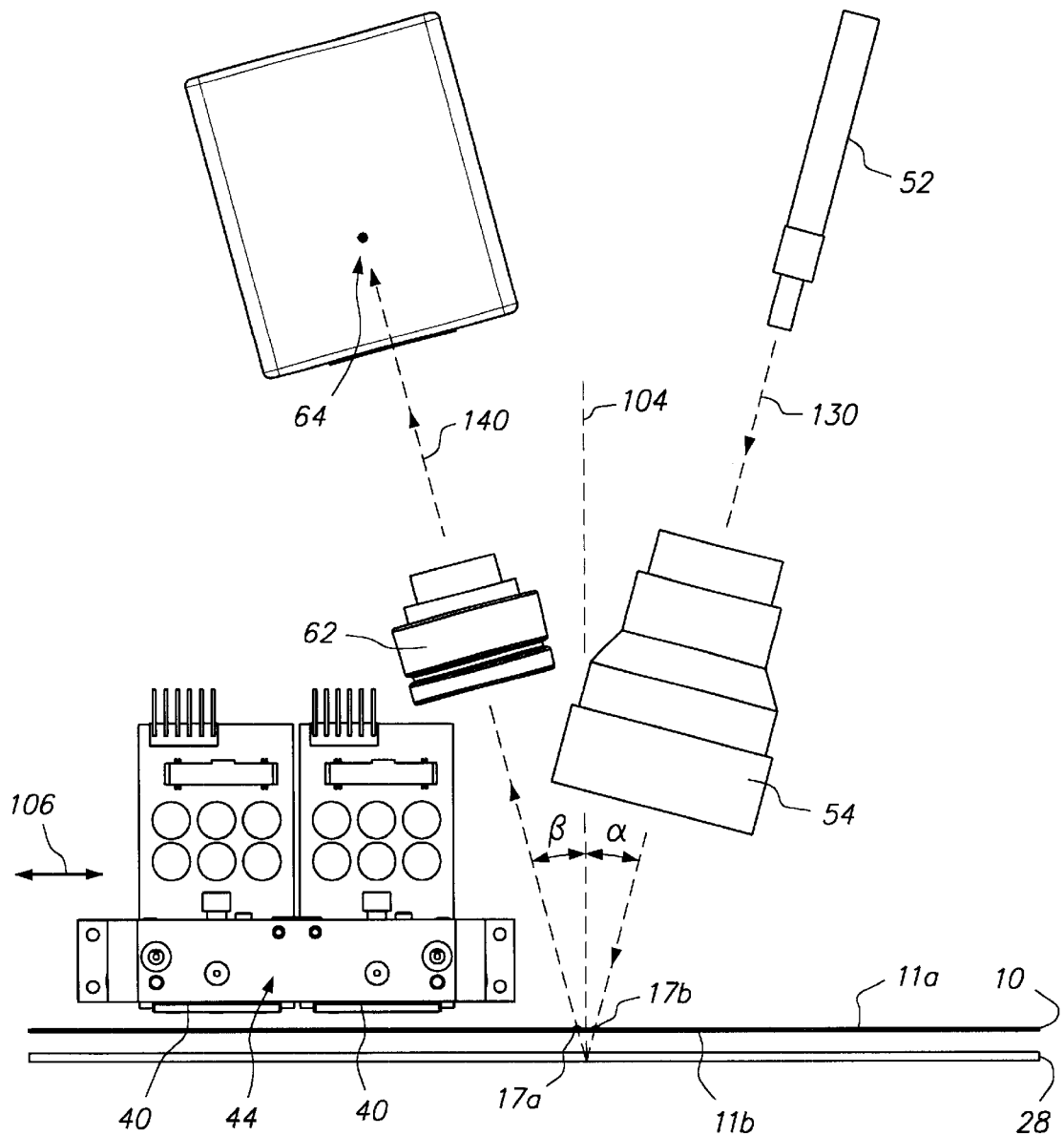
FIG. 5 is a vertical cross-section of the apparatus of FIG. 4 with a mounted substrate.
Figure 6:
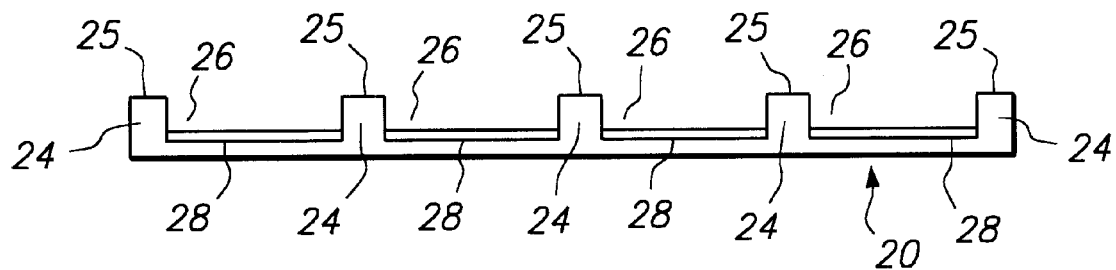
FIG. 6 is an end view of a chuck of the apparatus of FIG. 4.

Note that in the arrangement of light source 50 and camera 60 in FIGS. 4 and 5, sensor 64 images a fist droplet set (such as droplets in a line with position 17*a* in FIG. 5), whereas light from source 50 passes through substrate 10 from front side 11*a* at a position other than the first droplet set before being reflected by mirror segment 28 to pass back through the back side 11*b* of substrate 10 and the first droplet set. In the situation illustrated in FIG. 5 the light first passing through from the first side 11*a* passes through another droplet set (such as droplets in a line with position 17*b* in FIG. 5; sometimes referenced as a non first droplet set). In this situation, the mirror 27 being spaced from the back side 11*b* of substrate 10, allows any shadow produced by the non first droplet set, to be reduced at sensor 64. That is, if mirror 27 is at a distance from the substrate 10 that is far enough outside the depth of field for the line scan camera 60 during observation of an array, any shadows from non first droplet sets are out of focus and only create a slightly darker background in the image of a first droplet set. Typically one will choose the dimensions such that the virtual images generated by the plane mirror of the drops that one wants to be rejected are two, three or more times the depth of field away from the nominal plane of focus. The "depth of field" in this context may be that distance about the nominal plane of focus in which there is not more than one pixel size of blur in the case where the sensor has a pixel size, or in a lens system where the blur is "ε" in the nominal plane of focus the depth of field may be that distance over which the blur does not increase to a value higher than $\epsilon\sqrt{2}$. In an alternative definition, the depth of field for a lens of diameter "a" with a focal length "f" and a distance "s" to an object in the nominal focal plane, is that distance between (s+Dr) and (s−Df) where:

$$Df = sc(s-f)/\{fa+c(s-f)\}$$

$$Dr = sc(s-f)/\{fa+c(s-f)\}$$

where where "c" is known as the "circle of confusion" and for the human eye is typically 0.033 mm.

It will be appreciated that to obtain this effect, mirror 27 need only be spaced sufficiently from front side 11 by a distance which depends upon the depth of field of camera 60 (for example, the spacing might be at least 10 mm, or at least 20 mm, and preferably at least 30 mm). As referenced before, since mirror 27 is the actual reflecting surface it does not matter what transparent material is between that reflecting surface and the array.

Figure 7:
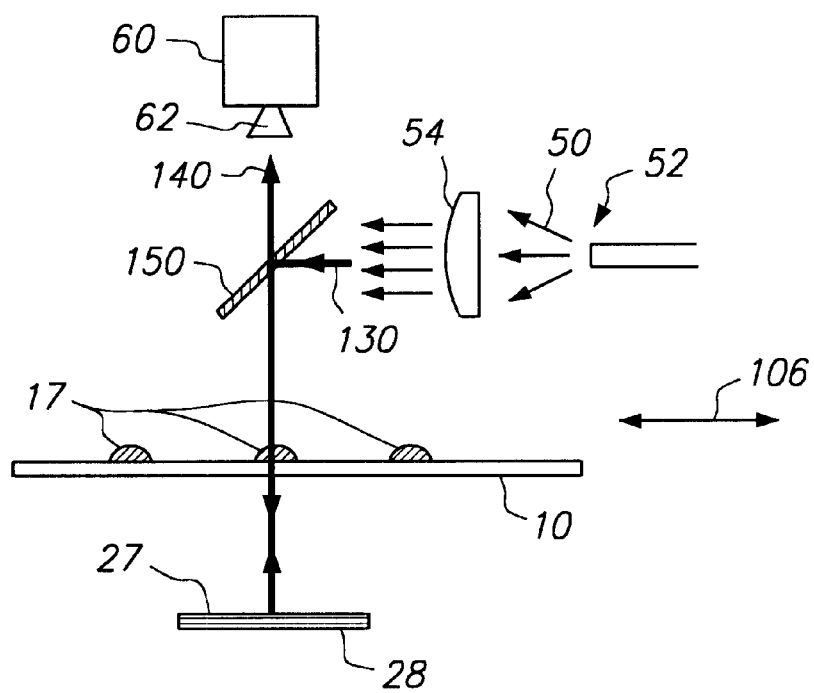
FIG. 7 schematically illustrates an alternative arrangement for the light source and sensor of the apparatus of FIG. 4.

In an alternate arrangement illustrated in FIG. 7, light source 50 and sensor 62 may be positioned such that light passes through the first droplet set when passing through the mounted substrate 10 from first side 11a, and is reflected by mirror 27 to again pass through the first droplet set. This can be accomplished by using a beam splitter 150 as illustrated in FIG. 7. In the illustrated arrangement then, both light from source 50 along axis 130, and the reflected light along axis 140 will be normal to front surface 11a. In the arrangement of FIG. 7, when the focused light from source 50 hits the wet droplets, some of the light will be reflected away from camera 60. The light that passes through the droplets is reflected off mirror 27 and will be focused again by the lensing effect of the wet droplets back to camera 60. This results in the wet droplet appearing as a dark ring with a bright center in the camera image which allows for excellent droplet imaging in the inspection process. Although, there is light loss with using beam splitter 150, the contrast of the droplet images that are captured by the camera is still very good for proper inspection. Note also with spacing between mirror 27 and the array as described in connection with the embodiment of FIGS. 4 and 5, shadow resulting from light initially passing through the first set of droplets before being reflected, can again be reduced at sensor 64.

Heads 40 may be of a type commonly used in an ink jet type of printer and each carrying hundreds of ejectors to deposit droplets. However, it will be appreciated that drop deposition devices other than heads 40 could be used. In the case of heads 40, each ejector is in the form of an electrical resistor operating as a heating element under control of the processor (although piezoelectric elements could be used instead). Each orifice with its associated ejector and a reservoir chamber, acts as a corresponding pulse jet with the orifice acting as a nozzle. In this manner, application of a single electric pulse to an ejector causes a droplet to be dispensed from a corresponding orifice (or larger droplets could be deposited by using multiple pulses to deposit a series of smaller droplets at a given location). Certain elements of head 40 can be adapted from parts of a commercially available thermal inkjet print head device available from Hewlett-Packard Co. as part no. HP51645A. However, other head configurations can be used as desired.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The sizes of the features 16 can have widths (that is, diameter, for a round spot) in the range from a minimum of about 10 $\mu$m to a maximum of about 1.0 cm. In embodiments where very small feature sizes are desired, material can be deposited according to the invention in small spots whose width is in the range about 1.0 $\mu$m to 1.0 mm, usually about 5.0 $\mu$m to 500 $\mu$m, and more usually about 10 $\mu$m to 200 $\mu$m. Feature sizes can be adjusted as desired, by using one or a desired number of pulses from a pulse jet to provide the desired final spot size.

The present methods and apparatus may be used to deposit biopolymers or on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length in the range about 4 mm to 1 m, usually about 4 mm to 600 mm, more usually about 4 mm to 400 mm; a width in the range about 4 mm to 1 m, usually about 4 mm to 500 mm and more usually about 4 mm to 400 mm; and a thickness in the range about 0.01 mm to 5.0 mm, usually from about 0.1 mm to 2 mm and more usually from about 0.2 to 1 mm. However, larger substrates can be used, particularly when such are cut after fabrication into smaller size substrates carrying a smaller total number of arrays 12.

In the present invention, any of a variety of geometries of arrays on a substrate 10 may be fabricated other than the organized rows and columns of arrays 12 of FIG. 1. For example, arrays 12 can be arranged in a series of curvilinear rows across the substrate surface (for example, a series of concentric circles or semi-circles of spots), and the like. Similarly, the pattern of regions 16 may be varied from the organized rows and columns of spots in FIG. 2 to include, for example, a series of curvilinear rows across the substrate surface(for example, a series of concentric circles or semi-circles of spots), and the like. Even irregular arrangements of the arrays or the regions within them can be used, at least when some means is provided such that during their use the locations of regions of particular characteristics can be determined (for example, a map of the regions is provided to the end user with the array). The configuration of the arrays and their features may be selected according to manufacturing, handling, and use considerations.

The substrates may be fabricated from any of a variety of materials, although they should be transparent to the wavelength of the illuminating light from source 50. In certain embodiments, such as for example where production of binding pair arrays for use in research and related applications is desired, the materials from which the substrate may be fabricated should ideally exhibit a low level of non-specific binding during hybridization events. In the present invention the substrates should also be substantially transparent to the wavelength of illumination during droplet inspection. For flexible substrates, materials of interest include: nylon, both modified and unmodified, nitrocellulose, , and the like, where a nylon membrane, as well as derivatives thereof, may be used. For rigid substrates, specific materials of interest include: glass; fused silica; plastics (for example, polytetrafluoroethylene, polystyrene, polycarbonate, and blends thereof, and the like).

The substrate surface onto which the polynucleotide compositions or other moieties is deposited may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Arrays produced by apparatus and methods of the present invention may be used by exposing them to a sample fluid to be tested, in a known manner, and interrogating the array following such interrogation. Interrogation can be by any means, such as by evaluating binding to the features by monitoring fluorescence of fluorescently labeled targets from them. Of course other means of interrogation can be used (for example, target bound to features may be labeled with chemiluminescent or other label). The exposure to the sample and interrogation may, for example, be at a first location (such as a laboratory), and the results or a conclusion based on the results (such as a diagnosis or interpretation of the results), may be communicated to a location remote from the first location (such as a doctor's office or patient's residence).

Various modifications to the embodiments of the particular embodiments described above are, of course, possible. Accordingly, the present invention is not limited to the particular embodiments described in detail above.

What is claimed is:

1. A method comprising:
   (a) depositing droplets of fluid carrying a biopolymer or biomonomer onto a front side of a transparent substrate so as to fabricate an array of moieties, wherein the biopolymer or biomonomer comprises an amino acid; and
   (b) directing light through the substrate from the front side then backward through the substrate and a first set of deposited droplets on the substrate front side, to an image sensor.

2. A method according to claim 1 wherein the light passes through the substrate from the front side at a position other than the first droplet set before being reflected to pass backward through the substrate and first droplet set, and wherein the light is reflected at a position spaced from a back side of the substrate so as to reduce at the sensor any shadow from any non first set droplets on the front side through which the light may initially pass before being reflected.

3. A method according to claim 2 wherein the light passes through the substrate from the front side at an angle to a normal of the front side, and passes backward through the back side and first droplet set at a complementary angle to the normal.

4. A method according to claim 1 wherein light passes through the first droplet set when passing through the substrate from the front side, before being reflected to again pass through the first droplet set.

5. A method according to claim 4 wherein the light is reflected at a position spaced from a back side of the substrate.

6. A method according to claim 1 additionally comprising:
   repeating step (b) for additional sets of the deposited droplets by scanning the directed and reflected light across the front side.

7. A method according to claim 6 wherein both a light source of the directed light and the image sensor are scanned in unison across the front side.

8. A method according to claim 6 wherein the droplets are deposited as droplet sets by a deposition head, and wherein multiple droplet sets are deposited by scanning the deposition head across the front side.

9. A method according to claim 8 wherein the light source, image sensor and deposition head are physically interconnected and are scanned in unison across the front side.

10. A method according to claim 6 wherein the light is reflected from a mirror which faces at least an area on a back side of the substrate corresponding to an area on the front side across which droplet sets are deposited.

11. A method according to claim 8 wherein:
    the substrate is held in a chuck having multiple upstanding ribs to support a back side of the substrate;
    light is reflected from a mirror comprising multiple mirror segments extending along channels defined between the ribs; and
    the deposition head is scanned across the front side of the substrate by scanning along the channels in turn.

12. A method according to claim 11 wherein:
    a light source of the directed light and a camera which includes the sensor, are positioned so as to direct and receive the reflected light at complementary angles to a normal of the front side such that light from the source initially passes through the front side of the substrate at a position other than the first droplet set before being reflected to pass through the first droplet set;
    the direction of light from the source to the sensor being on a plane oriented in the direction of the channels; and
    the source and sensor are scanned in a direction along the channels in turn.

13. A method according to claim 12 wherein the plane is parallel to the direction of the channels.

14. A method according to claim 8 wherein the deposition head is adjusted toward or away from the front side of the substrate independently of the sensor.

15. A method according to claim 8 additionally comprising, after depositing droplets of at least the first droplet set, re-positioning the substrate with respect to the light source and image sensor such that the reflected light is received at the image sensor after it has passed back through the first droplet set.

16. A method according to claim 1 additionally comprising exposing the array to a sample to be tested, and interrogating the array following exposure.

17. A method according to claim 1 additionally comprising exposing the array to a sample to be tested at a first location, interrogating the array, and communicating the result or a conclusion based on the result to a location remote from the first location.

18. A method according to claim 17 wherein the sample was obtained from a remote location.

19. An apparatus for fabricating an array of biopolymers, comprising:
    (a) a mount on which a transparent substrate can be mounted;
    (b) a deposition head to deposit droplets of a fluid carrying a biopolymer or biomonomer onto a front side of the mounted substrate, wherein the biopolymer or biomonomer comprises an amino acid;
    (c) a light source to direct light through the mounted substrate from the front side;
    (d) a reflector to reflect light from the source which has passed through the mounted substrate backward through the mounted substrate and a first set of deposited droplets on the front side; and
    (e) an image sensor facing a front side of the mounted substrate to receive the reflected light after it has passed back through the first droplet set.

20. An apparatus according to claim 19 wherein the reflector comprises a mirror facing a back side of the mounted substrate.

21. An apparatus according to claim 19 wherein the deposition head comprises multiple pulse jets each of which can be electrically activated to deposit a droplet.

22. An apparatus according to claim 21 wherein the volume of a droplet delivered by a pulse jet on a single activation is between 0.1 to 1000 pL.

23. An apparatus according to claim 19 wherein the light source and the image sensor, are positioned such that light from the source initially passes through the front side of the substrate at a position other than the first droplet set before being reflected to pass backward through the substrate and first droplet set.

24. An apparatus according to claim 23 wherein the mirror is spaced from the back side of the mounted substrate so as to reduce at the sensor any shadow from any droplets on the front side through which the light may initially pass before being reflected from the mirror.

25. An apparatus according to claim 23 wherein the light source is positioned to direct light through the substrate at an angle to a normal of the front side, and the image sensor is positioned to receive the light which has passed back through the first droplet set at a complementary angle to the normal.

26. An apparatus according to claim 23 wherein the light source and image sensor are positioned such that light from the source initially passes through the front side of the mounted substrate at the position of the first droplet set before being reflected to again pass through the first droplet set.

27. An apparatus according to claim 25 wherein the mirror is spaced from the back side of the substrate.

28. An apparatus according to claim 20 additionally comprising:
    a transport system to scan at least one of the deposition head and substrate across the other.

29. An apparatus according to claim 28 additionally comprising a processor to control the transport system and cause the deposition head to dispense multiple droplet sets in co-ordination with relative movement of the deposition head and substrate.

30. An apparatus according to claim 20 additionally comprising a transport system to scan both the light source and image sensor in unison across the front side so that the reflected light can be received at the sensor from additional sets of the deposited droplets.

31. An apparatus according to claim 20 wherein the light source, image sensor and deposition head are physically interconnected, and the transport system scans the light source, image sensor and deposition head in unison across the front side.

32. An apparatus according to claim 27 wherein:
    the substrate mount comprises a chuck having multiple upstanding ribs to support the back side of the substrate;
    the mirror comprises multiple mirror segments extending along channels defined between the ribs; and
    the transport system scans the deposition head across the front side of the substrate by scanning along the channels in turn.

33. An apparatus according to claim 32 wherein:
    the light source and a camera which includes the image sensor, are positioned so as to direct and receive the reflected light at complementary angles to a normal of the front side such that light from the source initially passes through the front side of the substrate at a position other than the first droplet set before being reflected to pass through the first droplet set;
    the direction of light from the source to the sensor being on a plane oriented in the direction of the channels; and
    the source and sensor are scanned in a direction along the channels in turn.

34. A method according to claim 33 wherein the plane is parallel to the direction of the channels.

35. An apparatus according to claim 20, wherein the light source, image sensor and deposition head are physically interconnected, the apparatus additionally comprising a transport system to scan the light source, image sensor and deposition head in unison across the front side.

36. An apparatus according to claim 35 wherein the transport system adjusts the deposition head toward or away from the front side of the mounted substrate independently of the sensor.

* * * * *